United States Patent
Piccolo, III et al.

(10) Patent No.: US 9,531,560 B2
(45) Date of Patent: Dec. 27, 2016

(54) METHOD AND APPARATUS FOR USING RENDEZVOUS SERVER TO MAKE CONNECTIONS TO FIRE ALARM PANELS

(75) Inventors: Joseph Piccolo, III, Fitzwilliam, NH (US); Timothy Martin, Westford, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 509 days.

(21) Appl. No.: 13/568,918

(22) Filed: Aug. 7, 2012

(65) Prior Publication Data
US 2014/0047080 A1 Feb. 13, 2014

(51) Int. Cl.
*G06F 15/177* (2006.01)
*H04L 12/28* (2006.01)
(Continued)

(52) U.S. Cl.
CPC ........... *H04L 12/2821* (2013.01); *G06F 21/31* (2013.01); *H04L 61/1535* (2013.01);
(Continued)

(58) Field of Classification Search
CPC .... H04L 29/08072; H04L 29/06; H04L 63/20; H04L 63/105; H04L 61/2007; G06F 21/31
(Continued)

(56) References Cited

U.S. PATENT DOCUMENTS

| | | | |
|---|---|---|---|
| 2007/0189190 A1* | 8/2007 | Feng | H04L 29/12518 370/254 |
| 2011/0040877 A1* | 2/2011 | Foisy | 709/226 |

(Continued)

FOREIGN PATENT DOCUMENTS

| | | |
|---|---|---|
| EP | 1 578 083 A1 | 9/2005 |
| WO | WO 2007/053029 A1 | 5/2007 |

OTHER PUBLICATIONS

"Sichere Fernwartung mit GeNUBox und Rendezvous-Server", May 12, 2005, pp. 1-8, XP055078779, Retrieved from the Internet: URL:http://www.kes.info/archiv/material/bsikongress2005/hand-out-schneck.pdf [retrieved on Sep. 11, 2013] (8 pgs).
"Secure Remote Maintenance with GeNUBox and Rendezvous Server", Sep. 11, 2013, p. 1-7, XP055078782, Retrieved from the Internet: URL:http://www.genua.eu/dateien/genubox-rendezvous-solution-en.pdf [retrieved on Sep. 11, 2013] (7 pgs).
(Continued)

*Primary Examiner* — John B. Walsh
*Assistant Examiner* — Weiwei Stiltner
(74) *Attorney, Agent, or Firm* — Brinks Gilson & Lione

(57) ABSTRACT

A method and system for using a rendezvous server to make connections to fire alarm panels. In one aspect, an external computer is used to communicate with an authentication computer in a secure overlay network in order for the external computer to establish a secure connection with the secure overlay network and to communicate with a rendezvous server in order for the external computer to, in turn, communicate with the target alarm panels in the secure overlay network. In another aspect, the rendezvous server receives a communication from the electronic device, with the communication indicative of the electronic device seeking to communicate with only devices in the secure overlay network, in response to the communication, accesses information to communicate with the target fire alarm panels and uses the accessed information in order for the electronic device to communicate with the target fire alarm panels.

24 Claims, 12 Drawing Sheets

(51) Int. Cl.
    *H04L 29/06*    (2006.01)
    *G06F 21/31*    (2013.01)
    *H04L 29/12*    (2006.01)
    *H04L 29/08*    (2006.01)
    *G08B 25/14*    (2006.01)
    *G08B 25/08*    (2006.01)

(52) U.S. Cl.
    CPC ...... *H04L 61/2007* (2013.01); *H04L 61/2503* (2013.01); *H04L 63/029* (2013.01); *H04L 63/0272* (2013.01); *H04L 63/105* (2013.01); *H04L 63/20* (2013.01); *H04L 67/125* (2013.01); *G08B 25/085* (2013.01); *G08B 25/14* (2013.01)

(58) Field of Classification Search
    USPC .......................................................... 709/220
    See application file for complete search history.

(56) References Cited

U.S. PATENT DOCUMENTS

| | | | |
|---|---|---|---|
| 2011/0219123 A1* | 9/2011 | Yang et al. | 709/227 |
| 2012/0204217 A1* | 8/2012 | Regis et al. | 725/116 |
| 2012/0233678 A1* | 9/2012 | Pal | 726/7 |
| 2012/0269092 A1* | 10/2012 | Hansen et al. | 370/254 |
| 2013/0086619 A1* | 4/2013 | Martell et al. | 725/114 |
| 2013/0276060 A1* | 10/2013 | Wiedmann et al. | 726/3 |
| 2013/0281044 A1* | 10/2013 | Smith et al. | 455/404.1 |

OTHER PUBLICATIONS

The International Search Report and The Written Opinion of the International Searching Authority, issued on Sep. 23, 2013 in corresponding PCT Application No. PCT/US2013/048151 (9 pgs).

* cited by examiner

METHOD AND APPARATUS FOR USING RENDEZVOUS SERVER TO MAKE CONNECTIONS TO FIRE ALARM PANELS

BACKGROUND

One or more fire alarm panels may be connected via a network with a central server. However, communication in the network is made more difficult if one of the fire alarm panels is behind a firewall or other network address translation (NAT) device.

A NAT device modifies IP address information in IP packet headers while in transit across a traffic routing device. The NAT device can hide an entire IP address space, usually comprising private IP addresses of the fire alarm panels, behind a single IP address (or in some cases a small group of IP addresses) in another (usually public) address space. Thus, the NAT device may have a single public IP address, behind which are one or more private IP addresses of the fire alarm panel(s).

There are different types of NATs. One type of NAT is a one-to-one NAT, which provides a one-to-one translation of IP addresses. In this type of NAT, the IP addresses, IP header checksum and any higher level checksums that include the IP address are changed, while the rest of the packet may be unchanged. Further, this type of NAT may be used to interconnect two IP networks with incompatible addressing.

Another type of NAT is a one-to-many NAT, which provides a one-to-many translation of IP addresses. There are also instances to hide an entire IP address space, usually comprising private IP addresses, behind a single IP address (or in some cases a small group of IP addresses) in another (usually public) address space. To avoid ambiguity in the handling of returned packets, the one-to-many NAT alters higher level information such as TCP/UDP ports in outgoing communications and must maintain a translation table so that return packets can be correctly translated back.

Using NATs enables communication through the router only when the conversation originates in the masqueraded network, since this establishes the translation tables. For example, a panel "behind" the NAT needs to initiate communication to an external device. This is because the panel behind the NAT has a private IP address, which is not known to the external device.

NATs are used to alleviate the consequences of IPv4 address exhaustion. Further, some systems using NATs do so in order to enable multiple hosts on a private network to access the Internet using a single public IP address.

Network address translation has serious drawbacks on the quality of Internet connectivity and requires careful attention to the details of its implementation. In particular, NATs break the originally envisioned model of IP end-to-end connectivity across the Internet, making it difficult for systems behind a NAT to accept incoming communications. This is particularly the case where panels behind the NATs need to be configured.

SUMMARY

In one aspect, a method for an external computer to communicate with one or more target fire alarm panels in a secure overlay network is provided. The secure overlay network includes one or more network address translation devices or firewalls, with the one or more target fire alarm panels behind the one or more network address translation devices or firewalls. The method comprises: communicating with an authentication computer in the secure overlay network in order for the external computer to establish a secure connection with the secure overlay network and for the external computer to communicate using the secure overlay network; and communicating with a rendezvous server via the secure overlay network in order for the external computer to communicate, via the one or more network address translation devices or firewalls, with the one or more target alarm panels in the secure overlay network. In one embodiment, the external computer may communicate with a rendezvous server via the secure overlay network in order to identify the target fire alarm panel by: sending a communication to the rendezvous server requesting information (such as network addresses and port numbers) in order to communicate with devices associated with the secure overlay network; receiving the information; and using the information to communicate with the one or more target alarm panels in the secure overlay network. In another embodiment, the external computer may communicate with a rendezvous server via the secure overlay network in order to identify the target fire alarm panel by: sending a communication to the rendezvous server, the communication indicative of a request for the rendezvous server to forward to the one or more target alarm panels.

In another aspect, a method for a rendezvous server to communicate with one or more target fire alarm panels and an electronic device in a secure overlay network is provided. The secure overlay network includes one or more network address translation devices or firewalls, with the one or more target fire alarm panels behind the one or more network address translation devices or firewalls, and with the electronic device for configuring or determining status of the one or more target fire alarm panels. The method comprises: receiving a communication from the electronic device, the electronic device authenticated for communication in the secure overlay network, the communication indicative of the electronic device seeking to communicate with only devices in the secure overlay network; in response to the communication, accessing information to communicate with the one or more target fire alarm panels; and using the accessed information in order for the electronic device to communicate with the one or more target fire alarm panels. In one embodiment, using the accessed information in order for the electronic device to communicate with the one or more target fire alarm panels comprises sending the information to the electronic device in order for the electronic device to communicate with the one or more target fire alarm panels. In an alternate embodiment, using the accessed information in order for the electronic device to communicate with the one or more target fire alarm panels comprises forwarding at least a part of the communication to the one or more target alarm panels using the accessed information.

In another aspect, a computer configured to communicate with one or more target fire alarm panels in a secure overlay network is provided. The secure overlay network includes one or more network address translation devices or firewalls, with the one or more target fire alarm panels behind the one or more network address translation devices or firewalls. The computer comprises: a communication interface; and a controller is communication with the communication interface. The controller is configured to: generate one or more authentication computer communications for sending to an authentication computer in the secure overlay network in order for the computer to establish a secure connection with the secure overlay network and for the computer to communicate using the secure overlay network; send, via the communication interface, the one or more authentication computer communications to the authentication computer;

generate one or more rendezvous server communications for sending to a rendezvous server via the secure overlay network in order for the computer to communicate, via the one or more network address translation devices or firewalls, with the one or more target alarm panels in the secure overlay network; and send, via the communication interface, the one or more rendezvous server communications to the rendezvous server.

In still another aspect, a rendezvous server configured to communicate with one or more target fire alarm panels and an electronic device in a secure overlay network is provided. The secure overlay network includes one or more network address translation devices or firewalls, with the one or more target fire alarm panels behind the one or more network address translation devices or firewalls, and with the electronic device for configuring or determining status of the one or more target fire alarm panels. The rendezvous server comprises: a communication interface configured to receive a communication from the electronic device, the electronic device authenticated for communication in the secure overlay network, the communication indicative of the electronic device seeking to communicate with only devices in the secure overlay network; a memory; and a controller is communication with the communication interface and the memory. The controller is configured to: in response to receiving the communication, access information in the memory to communicate with the one or more target fire alarm panels; and use the accessed information in order for the electronic device to communicate with the one or more target fire alarm panels.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

As discussed in the background, in many computer network applications (e.g., peer-to-peer networking), it is desirable for two or more clients to establish direct connections with each other without requiring all information to pass through a centralized server. To connect to another network node, a client generally sends a message to a recipient node requesting a connection. However, if the intended recipient node is behind a firewall or other network address translation (NAT) device, this connection request may be blocked. This is because a NAT device may be configured to only allow messages to reach an intended recipient when the message is in response to communication initiated by the recipient.

When two nodes are both behind different NAT devices, neither node is able to initiate the connection to the other node because the incoming connection requests are blocked by the NAT device on the receiving end. As a result, the nodes will be unable to connect to each other. This creates a challenging problem in applications such as peer-to-peer networking, or other network applications that are not specifically peer-to-peer, but nevertheless utilize direct communication between two devices on a network.

Figure 1:
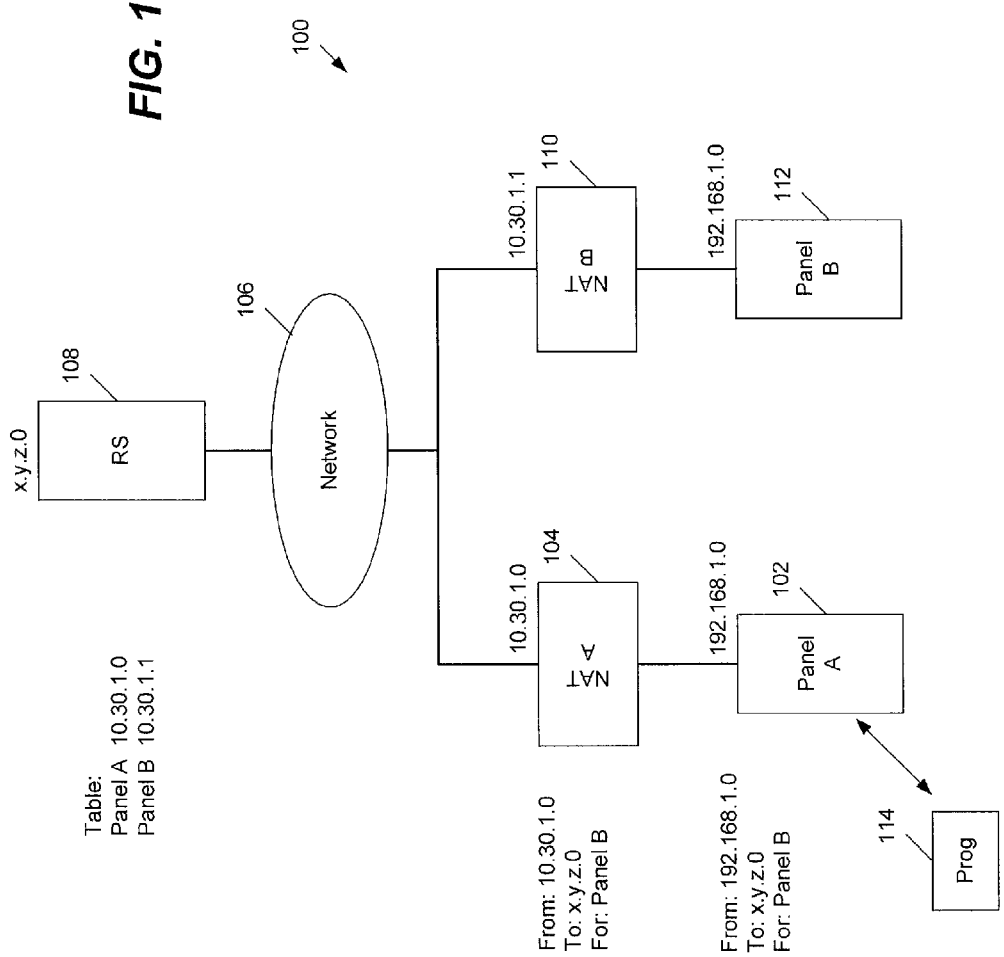
FIG. 1 is one example of a layout for multiple panels, multiple NATs, and a rendezvous server.

An example of a system 100 with two nodes behind different NAT devices is illustrated in FIG. 1. The system includes two panels (Panel A 102 and Panel B 112), two NAT devices (NAT A 104 and NAT B 110), a network 106, and a rendezvous server (RS) 108. The panels may control part or all of a Fire Alarm System. The panel includes one, some, or all of the following functionality: receiving information from one or more environmental sensors designed to detect changes associated with fire; monitoring their operational integrity and provides for automatic control of equipment; and transmitting information necessary to prepare the facility for fire according to a predetermined sequence. The panel may also supply electrical energy to operate any associated sensor, control, transmitter, or relay. Panel A 102, NAT A 104, Panel B 112, and NAT B 110 may be part of the same local network (such as a local area network (LAN)), and may communicate via a LAN networking protocol (such as Ethernet®). Alternatively, Panel A 102 and NAT A 104 may be part of a first LAN and Panel B 112 and NAT B 110 may be part of a second LAN. The network 106 may comprise a wide area network (WAN), such as the Internet. As shown in FIG. 1, RS 108 is coupled to the network 106. Alternatively, RS 108 may be coupled to a LAN, such as the local area network associated with NAT A 104 or NAT B 110.

RS 108 is a specialized computing device that facilitates connections between Panel A 102 and Panel B 112. After startup, RS 108 listens for connection attempts from new panels. Each time a new panel connects, RS 108 stores information about the connection in a table for later use and begins processing packets for the connecting panel. For example, RS 108 may store a "public name" identifying the connecting panel and may also store additional information about current or prior connections established by the panels. As used herein, a "name" is an identifier for a given panel. The public name used by RS 108 may correspond to the initial public address of a panel seen by RS 108 when the panel first contacts RS 108. Alternatively, the rendezvous server may store a different public name identifying the panel.

As discussed in more detail below, RS 108 may be a traditional web server situated anywhere in communication with network 106. Alternatively, RS 108 may be located in the local area network for Panel A 102 or Panel B 112, and may communicate via a local Ethernet® connection. Further, RS 108 may be built into a panel so that RS 108 includes fire alarm panel functionality as well.

RS 108 may search for other panels in the system and share information to determine addresses for each of the panels in the system using a protocol to facilitate communication amongst rendezvous servers. For example, a rendezvous server discovery communication may be sent on a particular subnet.

As shown in FIG. 1, Panel A 102 is "behind" NAT A 104 with respect to the WAN 106. Likewise, Panel B 112 is "behind" NAT B 110 with respect to the WAN 106.

To facilitate routing of data packets to and from Panel A 102 and Panel B 112, each of Panel A 102 and Panel B 112 are assigned a private IP address that uniquely identifies the respective panel on the local network (such as the local LAN). A panel may then send a communication (such as a data packet) that specifies the panel itself (e.g., the transmission IP address) and the intended recipient (e.g., the destination IP address).

An example of this is shown in FIG. 1. The panels may have stored thereon the particular Domain Name, which is the human-memorable domain name for the RS. The panel sends the Domain Name to a Domain Name Server (DNS), which translates the Domain Name into the corresponding numeric Internet Protocol (IP) address for the RS. For example, Panel A 102 may send out communication with the Domain Name. The DNS returns the IP address for RS 108 (or in the case of multiple RSs, to one of the RSs). As shown in FIG. 1, Panel A 102 sends a communication to RS 108 with the following information: the transmission IP address ("From: 192.168.1.0") and the destination IP address ("To: x.y.z.0"). NAT A 104 receives the communication from Panel A 102, and modifies the communication prior to transmission so that the communication appears as if it were coming from a single IP address (the "NAT IP address"). In the example given, NAT A 104 modifies the communication to change the transmission IP address to 10.30.1.0. The NAT device maintains a NAT table that provides a mapping which enables the NAT device to forward an IP packet destined for a specific public address to a specific private address of one of the panels. In this way, the NAT device may be used with a private network, which uses a private IP address space. Thus, when a NAT device receives an outbound communication packet from one of the panels, the NAT device changes the original source address in the outbound communication packet from the private address panel address to the corresponding public NAT address such that a returning packet will be appropriately forwarded to the correct destination (the particular panel), and the NAT device creates the relevant mapping entry in the NAT table as needed.

Incoming packets from outside the NAT device all have as their destination IP address one of the public IP addresses of the NAT device (such as NAT A or NAT B). When the NAT device receives an incoming packet from network 106, it looks up the appropriate destination address in its map and forwards the packet to the appropriate panel.

The panels (Panel A 102 and Panel B 112) can communicate with one another using RS 108. RS 108 is connected directly to the network 106 so that its address is therefore always public (i.e., not behind a protective firewall). Thus, Panel A 102 and Panel B 112 behind NAT A 104 and NAT B 110, respectively can communicate with the RS 108. For example, the address of RS 108, such as x.y.z.0 may be hardcoded into Panel A 102 and Panel B 112. Furthermore, once a panel initiates communication with RS 108, the respective NAT device may update its table to allow RS 108 to send return communications. Thus, two-way communication can be established between a panel and RS 108. RS 108 can thus assist the panels in traversing the NAT devices and enable communication between the panels.

As one example, RS 108 may act as a "bridge" between Panel A 102 and Panel B 112. Panel A 102 sends a communication to the RS with an indication that the communication is for transmission to Panel B 112. RS 108 can then route the communication to Panel B 112 since RS 108 has the table with the path, via NAT B 110, of Panel B 112.

As another example, RS 108 can send to Panel A 102 the "path" to Panel B 112 in order for Panel A 102 to send a communication "directly", not via the RS 108, to Panel B 112. The "path" includes the address for NAT B 110, and additional information (such as one or more port numbers). For example, the additional information may include one or more port numbers. A port may include an application-specific or process-specific software construct serving as a communications endpoint in a computer's host operating system. The port may be associated with the IP address of the host, as well as the type of protocol used for communication. A port is identified for each address and protocol by a 16-bit number, commonly known as the port number, which may complete the destination address for a communications session. The additional information (such as the port number) may be used by NAT B 110 to recognize that the communication sent is not for NAT B 110, but for Panel B 112 associated with NAT B 110. In this way, the panels need not communication with RS 108, and may communicate on a local network, such as a local area network.

At times, access to one or more of Panel A 102 and Panel B 112 may be required in order to perform maintenance. NATs in the system may make it difficult for a technician to communicate with all of the panels in the system. One way to access the panels using a rendezvous server is to request from the rendezvous server access to all networks. However, this request would encompass many additional networks separate from the specific network that includes Panel A 102 and Panel B 112. In this way, using the rendezvous server would provide access to too many networks, and in turn, too many devices associated with the networks. Thus, in order to accomplish the task of accessing the panels, a technician would previously have had to travel to each of the panels in order to access information on the panels.

In one aspect of the invention, a system and methodology are presented that enables a technician to limit communication to the relevant fire alarm network (e.g., that includes Panel A 102 and Panel B), thus enabling the technician to communicate with all of the panels in a particular fire alarm system, even if some of the panels are behind NATs. The panels in the fire alarm system are within an overlay network (such as a secure overlay network). The technician may access the overlay network, and in turn communicate with the rendezvous server to communicate only with other devices on the overlay network. In this way, the technician is able to communicate only with the devices within the overlay network. For example, the technician may use a computer to connect (either locally or remotely) with one of the panels in the overlay network. In order to connect to the overlay network, the technician (via the technician's computer) submits information for authentication. In response to the submission, a VPN management computer reviews the submitted information and authenticates the technician's computer (if the information is authenticated as entitled to be connected to the overlay network). The rendezvous server may also serve as the VPN management computer. Alternatively, the rendezvous server may be separate from the VPN management computer.

Once the technician's computer is connected to the overlay network, the technician's computer may communicate with RS 108 in order to communicate with all of the other panels on the overlay network. In particular, once the technician's computer is part of the overlay network, the technician's computer is allowed access to the information for that overlay network, such as by requesting the RS 108 for the connection information, such as IP addresses and ports, of the other panels in the overlay network. In other words, since the technician is interested in communicating with the devices on the overlay network, the technician's computer may request from the RS 108 the information (such as the table of IP addresses and ports) used to communicate with the devices in the overlay network. The technician's computer may then use the information to communicate with the panels in the overlay network.

Prog 114 is an example of a computing device that the technician may use to communicate with one or more of the panels in an overlay network (such as a secure overlay network). Prog 114 is discussed in more detail in FIG. 10. The overlay network is a computer network which is built on top of or derived from another network. Nodes in the overlay may be thought of as being connected by virtual or logical links, each of which corresponds to a path, perhaps through many physical links, in the underlying network.

One example of an overlay network is a Virtual Private Network (VPN). A VPN is a network that can use a public network, such as the Internet, to provide remote offices or traveling users access to a central organizational network. VPNs typically require users of the network (such as remote users) to be authenticated, and often secure data with encryption technologies to prevent disclosure of private information to unauthorized parties. For example, secure VPNs may use cryptographic tunneling protocols to provide confidentiality by blocking intercepts and packet sniffing, allowing sender authentication to block identity spoofing, and provide message integrity by preventing message alteration. One type of VPN is remote access VPNs, which are for individual users who are not in a fixed location (such as remote or roaming users like technicians). VPNs may serve any network functionality that is found on any network, such as sharing of data and access to network resources, printers, databases, websites, etc. A VPN user may experience the central network in a manner that is identical to being connected directly to the central network.

For example, a VPN may work by using the shared public infrastructure while maintaining privacy through security procedures and tunneling protocols. In effect, the tunneling protocols, by encrypting data at the sending end and decrypting it at the receiving end, send the data through a "tunnel" that cannot be "entered" by data that is not properly encrypted. An additional level of security involves encrypting not only the data, but also the originating and receiving network addresses.

Thus, VPN makes a computer (such as prog 114) in one IP space a part of the IP space of the overlay network as if it were physically there. For example, when a computer dials from a remote location into an overlay network via VPN, the computer has a particular IP address on the Internet. The computer (such as prog 114) may then authenticate itself to the VPN (such as to RS 108) in order to gain entry to the VPN, and thereafter send communications to devices in the VPN. In a fire alarm system with multiple panels in a building, VPN logically places the computer as if it was inside the building and connected to the overlay network. The computer is assigned an IP address "inside" the overlay network. So that, the computer is at IP address 192.168.1.0; however, everything within the overlay network is as if the computer has an address within the overlay network. Communications can go outside the overlay network; however, the communications are encrypted, so that the communications cannot be understood even if the communications were intercepted on the Internet.

Once a computer (such as prog 114) is connected to the overlay network via the VPN, the computer is, in effect, a member of the VPN and may access network functionality that is found on the VPN, such as sharing of data and access to network resources, printers, databases, websites, etc. (including access to information from the RS 108 to communicate with other devices in the VPN, such as the fire alarm panels in the VPN). In this way, a VPN user typically experiences the central network in a manner that is identical to being connected directly to the central network.

As shown in FIG. 1, prog 114 communicates with Panel A 102. The communication between prog 114 and Panel A 102 may be via a wired and/or wireless connection. Further, prog 114 may communicate with Panel A 102 locally (so that prog 114 is either plugged-in directly to Panel A 102 or connected proximately to Panel A 102 (such as via a Bluetooth connection). Alternatively, prog 114 may communicate with Panel A 102 remotely, so that prog 114 may access Panel A 102 via a networked connection (such as via a LAN connection or a WAN connection).

One way to create a remote connection between prog 114 and Panel A 102 is for a technician to travel to Panel A and allow prog 114 remote access. Another way is to use credentialing strong enough to ensure that the computer (prog 114) attempting to access Panel A 102 externally is an authorized user. Once prog 114 makes a secure connection to the local network, prog 114 can communicate with RS 108 in order to "see" the other panels in the local network.

Figure 2:
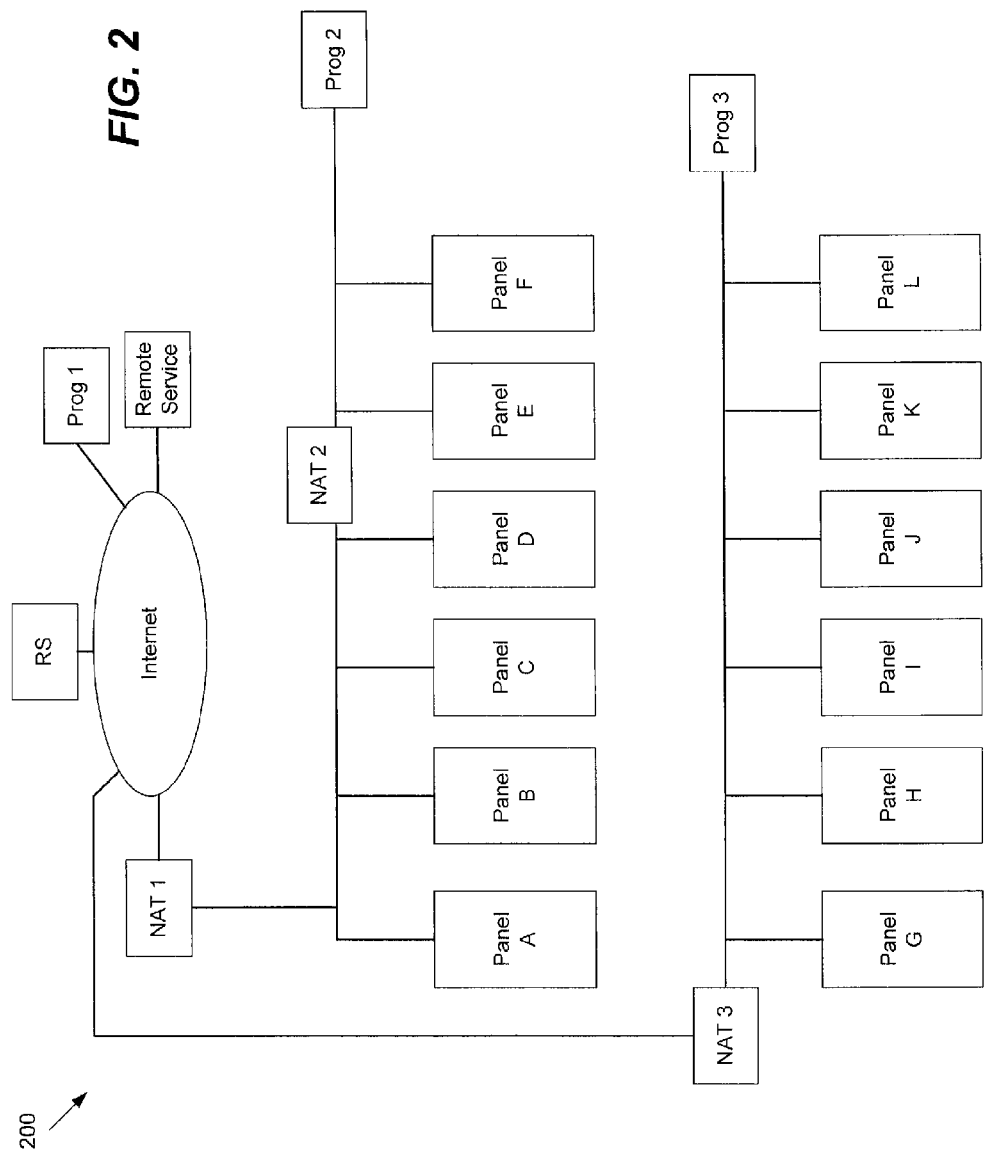
FIG. 2 is another example of a layout for multiple panels, multiple NATs, and a rendezvous server.

FIG. 2 illustrates another system 200 with a more detailed implementation. FIG. 2 includes multiple panels (Panel A, Panel B, Panel C, Panel D, Panel E, Panel F, Panel G, Panel H, Panel I, Panel J, Panel K, and Panel L). FIG. 2 also illustrates prog 1, prog 2 and prog 3. prog 1, prog 2 and prog 3 may be three different programming computing devices in system 200. Alternatively, prog 1, prog 2 and prog 3 may be the same computing device placed in three different sections of system 200 at different times, including connected to the Internet (prog 1), connected to Panel F (prog 2) or connected to Panel L (prog 3).

In one aspect, the secure overlay network includes Panel A, Panel B, Panel C, Panel. D, Panel E, Panel F, Panel G, Panel H, Panel I, Panel J, Panel K, and Panel L. In another aspect, multiple secure overlay networks are used, such as a first secure overlay network including Panel A, Panel B, Panel C, Panel D, Panel E, and Panel F, and a second secure overlay network including Panel G, Panel H, Panel I, Panel J, Panel K, and Panel L. These two examples of secure overlay networks are merely for illustration purposes. Other secure overlay networks are contemplated.

Figure 3A:
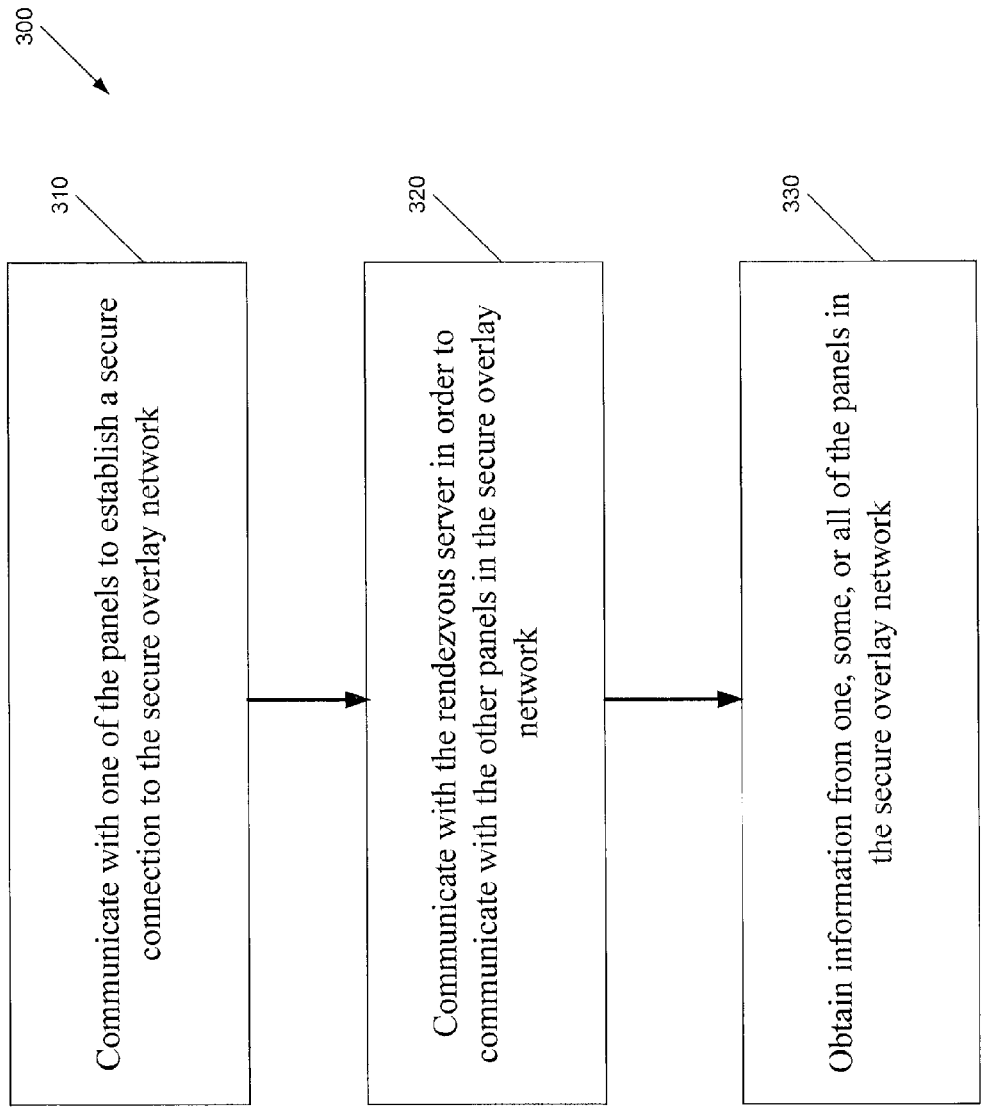
FIG. 3A is a flow chart for a programming device to establish a connection to the secure overlay network and to communicate with the panels in the secure overlay network.

Regardless of the configuration of the overlay network, one of the programming devices (such as prog 1, prog 2, or prog 3) may connect to a panel in the secure overlay network, exchange certificates in order to create a secure connection via VPN, and then communicate with RS in order to communicate with one some or all of the panels in the secure overlay network. This is illustrated, for example, in FIG. 3A, which is a flow chart 300 for a programming device to establish a connection to the secure overlay network and to communicate with the panels in the secure overlay network. At block 310, the computer, such as prog 1, prog 2, or prog 3, communicates with one of the panels to establish a secure connection to the secure overlay network. For example, the controller of the computer in prog 1, prog 2, or prog 3 may generate one or more authentication computer communications for sending to an authentication computer in the secure overlay network in order for the computer to establish a secure connection with the secure overlay network and for the computer to communicate using the secure overlay network; and send, via a communication interface, the one or more authentication computer communications to the authentication computer.

For example, prog 2 may communicate with Panel F via VPN to create a secure connection. The communications between prog 2 and Panel F are via the secure overlay network, which is created with its own IP address space on top of the public network. The communications between the nodes in the secure overlay network are encrypted and secure. Prog 2, connected as shown in FIG. 2 "finds" Panels E and/or Panel F. Prog 2 connects to the panels it finds, and exchanges certificates. Prog 2 is then brought into the secure overlay network of the panel to which it is connected (e.g., Panel E or Panel F).

The various panels (such as Panel E and Panel F) and prog 2 create a VPN connection with one another. There are different ways to create a VPN connection. One way is to create VPN point to point, wherein the different devices create the VPN connection with one another. Another way is to have a VPN server so that communications within the network are not encrypted, but communications sent outside of the network are encrypted. In this way, the VPN server acts as a gateway.

At 320, the computer, such as prog 1, prog 2, or prog 3, communicate with the rendezvous server in order to communicate with the other panels in the secure overlay network. In particular, prog 1, prog 2, or prog 3 may generate one or more rendezvous server communications for sending to a rendezvous server via the secure overlay network in order for the computer to communicate, via the one or more network address translation devices or firewalls, with the one or more target alarm panels in the secure overlay network and send, via the communication interface, the one or more rendezvous server communications to the rendezvous server.

For example, once prog 2 is part of the secure overlay network of the panels, prog 2 is allowed by the RS to "see" all of the panels only in this secure overlay network. In particular, the RS can allow prog 2 to communicate with the other panels in the secure overlay network (either by the RS acting as a bridge or the RS sending the IP information to prog 2 in order for prog 2 to communicate directly with the other panels in the secure overlay network). Thus, prog 2 is shown in FIG. 2 as connected to Panel F. Prog 2 can then communicate with the rendezvous server (such as RS).

At 330, the computer, such as prog 1, prog 2, and prog 3, may obtain information from one, some or all of the panels in the secure overlay network. For example, the rendezvous server can then facilitate prog 2 to communicate with the other panels in the particular secure overlay network. As discussed above, the rendezvous server may act as a bridge, thus enabling prog 2 to communicate with the other panels in the secure overlay network. Alternatively, the rendezvous server may send information to prog 2 in order for prog 2 to communicate directly with the panels in the secure overlay network. So that, once prog 114 makes a secure connection to at least one panel, prog may then communicate with RS 108. In turn, RS 108 may provide a table of part or all of the panels in the secure overlay network.

Figure 3B:
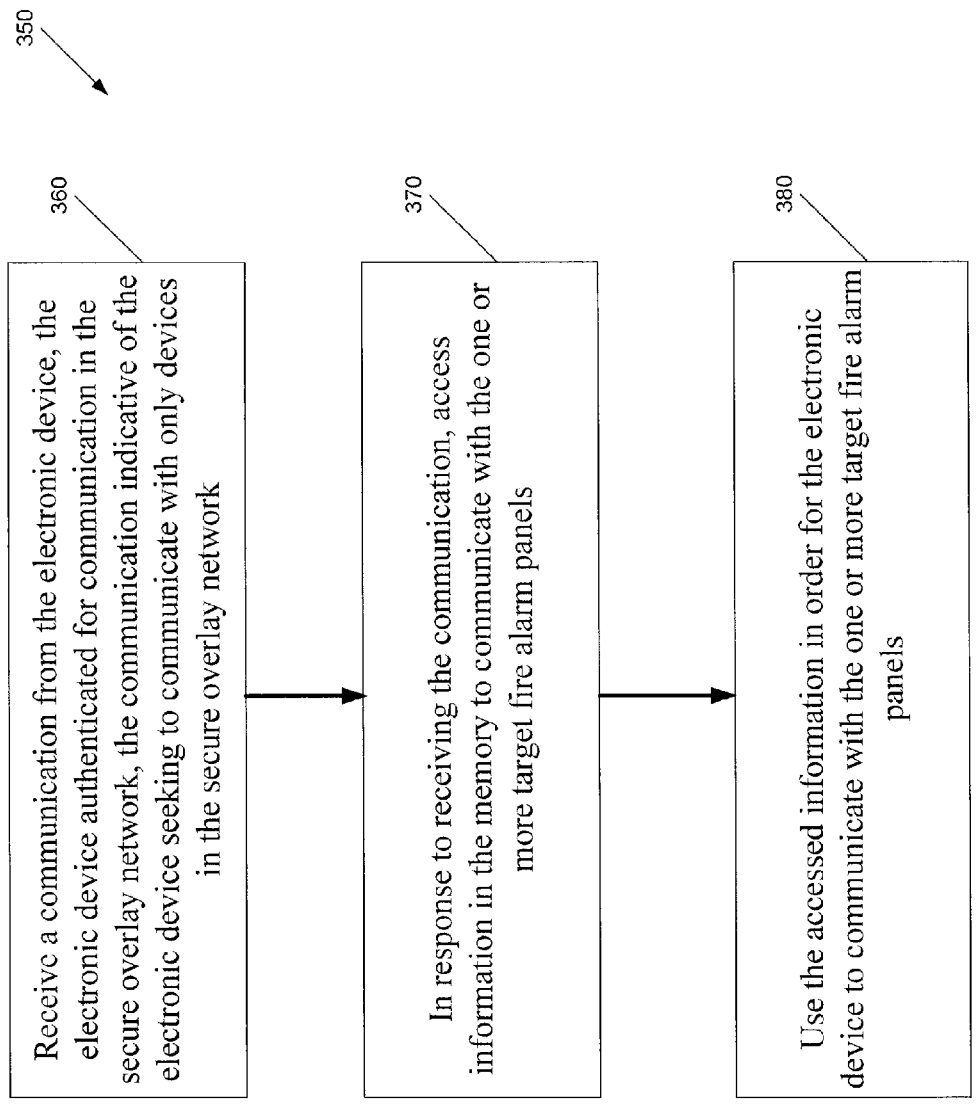
FIG. 3B is a flow chart for a rendezvous server to receive and respond to a request from a programming device to establish a connection to the secure overlay network.

FIG. 3B is a flow chart 350 for a rendezvous server to receive and respond to a request from a programming device to establish a connection to the secure overlay network. At 360, the rendezvous server (such as the communication interface of the rendezvous server) receives a communication from the electronic device (such as prog 1, prog 2, and prog 3), with the electronic device previously authenticated for communication in the secure overlay network, the communication indicative of the electronic device seeking to communicate with only devices in the secure overlay network. At 370, the rendezvous server, in response to receiving the communication, accesses information in a memory to communicate with the one or more target fire alarm panels. The information may be in the form of one or more look-up tables, such as discussed in FIGS. 1 and 2. At 380, the rendezvous server uses the accessed information in order for the electronic device to communicate with the one or more target fire alarm panels. For example, in one embodiment, the controller of the rendezvous server may be configured to use the accessed information in order for the electronic device to communicate with the one or more target fire alarm panels by sending the information to the electronic device in order for the electronic device to communicate with the one or more target fire alarm panels. As another example, in an alternate embodiment, the controller of the rendezvous server may be configured to use the accessed information in order for the electronic device to communicate with the one or more target fire alarm panels by forwarding at least a part of the communication to the one or more target alarm panels using the accessed information.

In this way, the Rendezvous Server is configured to make it easier for service personnel to connect to fire alarm panels residing on a customer site's IP network, even if that network is complex and subdivided. To illustrate this, consider a campus that has two buildings having multiple fire alarm panels in each. These fire alarm panels are connected to a single fire alarm network and are also attached to the campus IP network, which uses NATs to isolate the address spaces in each building. A technician plans to use the IP network to perform maintenance tasks on the fire alarm panels, including uploading and downloading job files, because it is much faster to use the IP network than the fire alarm network.

Without the Rendezvous Server, the technician would not necessarily be able to discover and reach the fire alarm panels in other buildings. This is because the reachability of these fire alarm panels could be blocked by network devices such as NATs. In these cases, the technician would either need to solicit the assistance of the customer's IT group to get around these barriers, or physically travel to the other building and plug his laptop into that building's IP network in order to access the fire alarm panels.

Figure 4:
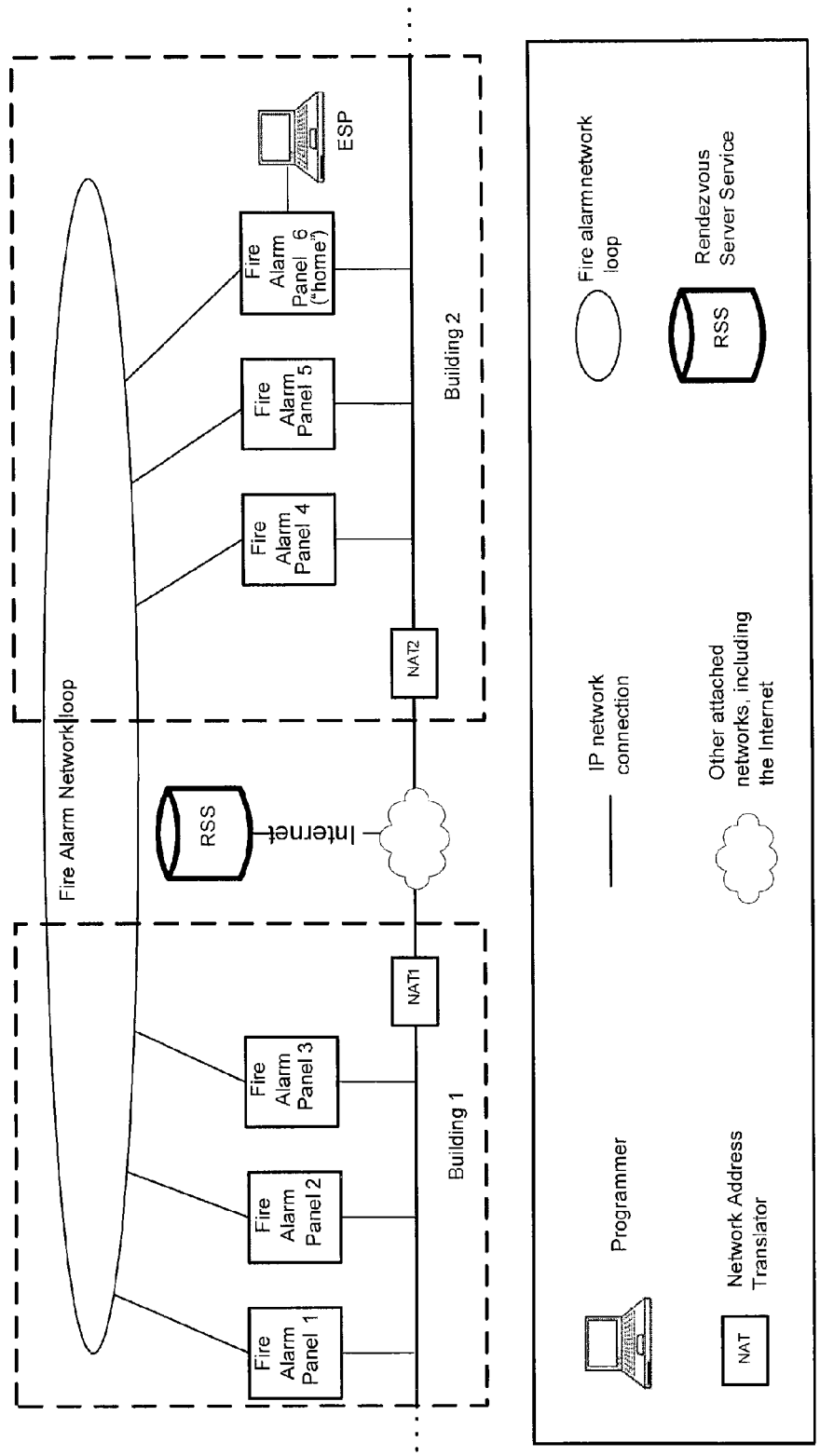
FIG. 4 is an example of a layout with the rendezvous server service communicating with the fire alarm panels.

The RS may be configured in one of three forms: an Internet accessible service (such as a Rendezvous Server Service (RSS) illustrated in FIG. 4); a locally installed hardware appliance (such as a Rendezvous Server Appliance (RSA), which may reside in the fire alarm network as a separate device); or the functionality built into a fire alarm panel.

FIG. 4 illustrates a solution using the RSS. The RSS is a globally accessible service available on the Internet. To take advantage of this service, the technician does not need to perform any configuration. In one implementation, the technician only needs to ensure the following: each fire alarm panel to be serviced is connected to the fire alarm network loop; each fire alarm panel to be serviced is connected to the building's IP network; a laptop, having the Panel Selection Component (PSC) software (discussed below) installed on it, is connected to one of the fire alarm panels; remote download is enabled across the fire alarm network loop; and the building's IP network has at least one port open to the Internet. In particular, if the technician's laptop is attached to a fire alarm panel that is on both the IP and fire alarm networks (a "home" panel), the PSC software on the technician's laptop will be able to discover and reach fire alarm panels in both buildings, despite the presence of NATs. This is providing that a RSS is available and reachable by all the fire alarm panels and the programming software.

When a technician connects his laptop (or other portable computing device) to one of the fire alarm panels on the fire alarm network, the RSS may be automatically utilized and all fire alarm panels in one, some, or all buildings on the same fire alarm network are reachable through this single connection. Because of this, the technician does not need to travel to the other building to complete his maintenance tasks; he may achieve them all from a single location. FIG. 4 illustrates how this is achieved.

Figure 5:
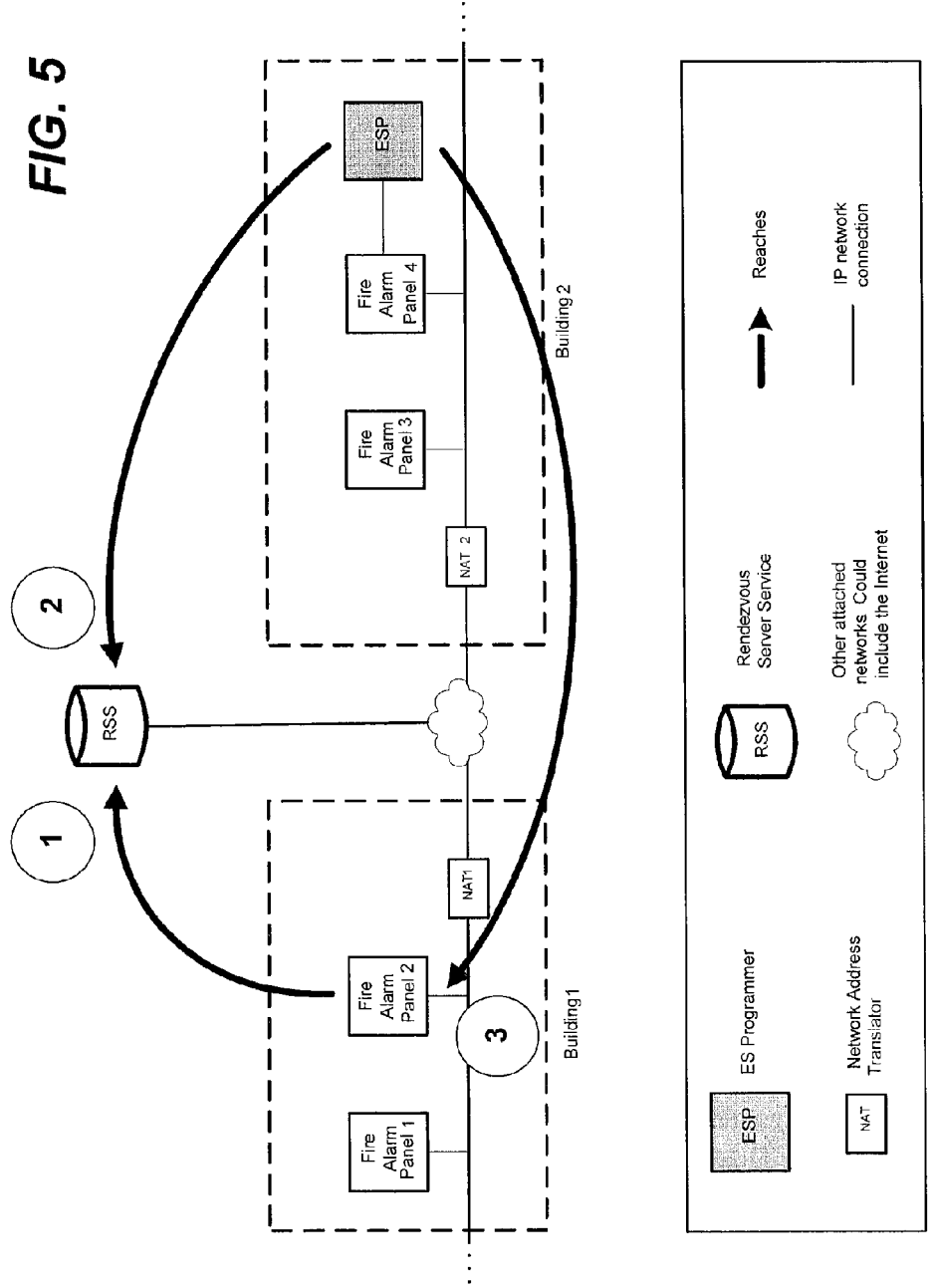
FIG. 5 illustrates the sequence of communications with the rendezvous server.

FIG. 5 illustrates the sequence of operations for a configuration as illustrated in FIG. 4. In the example illustrated in FIG. 5, a technician wishes to use the PSC software in order to find and connect to fire alarm panel 2 in another building where the buildings are separated by NATs. As shown in step 1, all fire alarm panels, including fire alarm panel 2 register themselves through the RSS. The registration of the fire alarm panels may be automatic and may comprise each of the fire alarm panels sending a communication to the RSS. As shown in step 2, the PSC software finds fire alarm panel 2 using the RSS and in order to obtain the reachable address of fire alarm panel 2. As shown in step 3, the PSC software communicates with and connects to fire alarm panel 2 using the reachable address.

Figure 6:
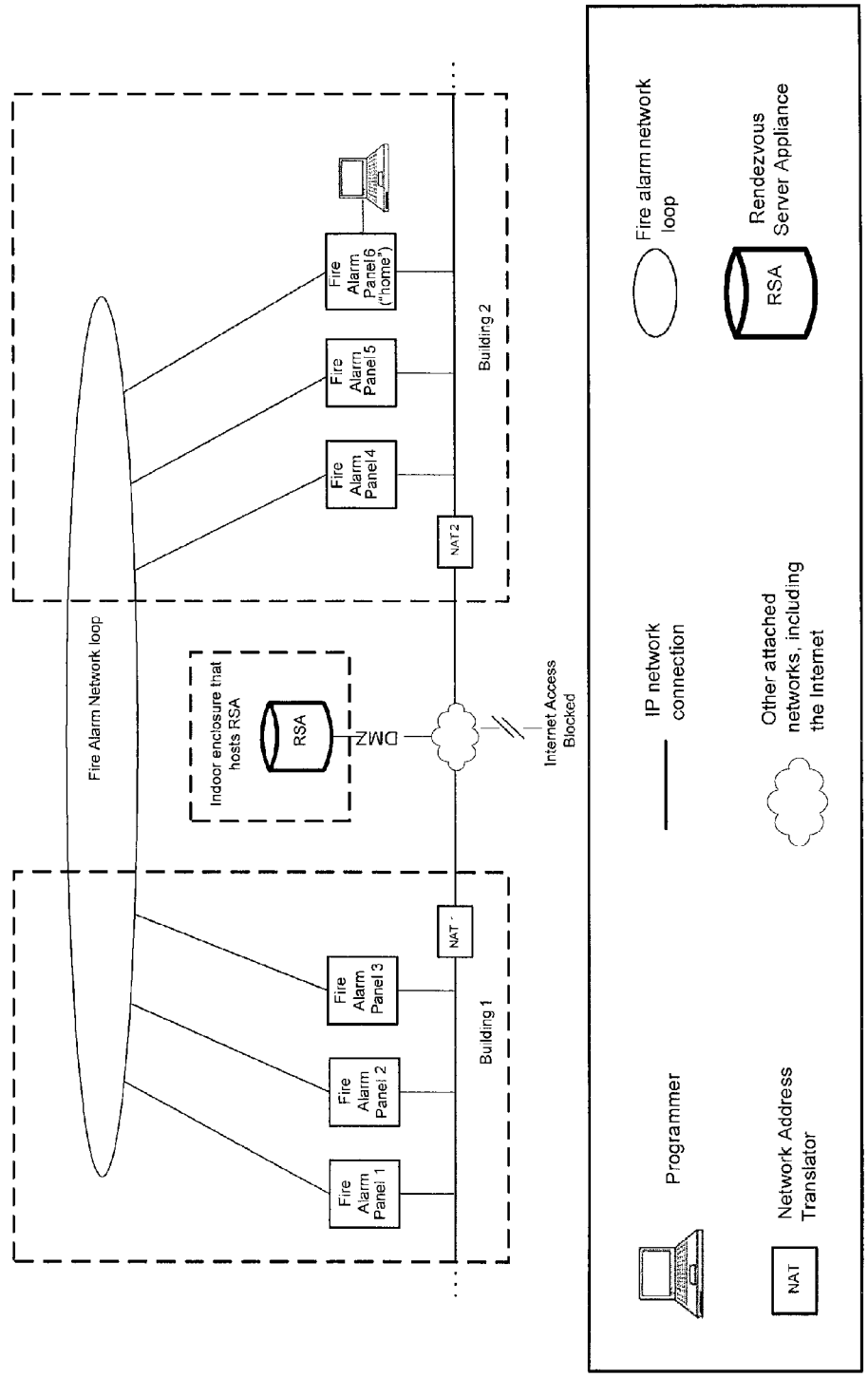
FIG. 6 is an example of a layout with the rendezvous server appliance communicating with the fire alarm panels.

FIG. 6 illustrates a solution using the RSA. The RSA may be a physical box having an integrated RS that can be used in lieu of the RSS if access to the Internet cannot be provided or reliably assured. As such, the RSA is a specialized device, and is intended to be used if necessary. Unlike the RSS, the RSA is locally installed and may require configuration.

As shown in FIG. 6, if the technician's laptop is attached to a fire alarm panel that is on both IP and fire alarm networks (a "home" panel), the technician can use the PSC software to discover and reach the fire alarm panels in both buildings, despite the presence of NATs and blocked Internet access. This is providing that an RSA is available and reachable by all of the fire alarm panels and the PSC software on the technician's laptop.

To illustrate the role of a RSA, one may suppose that the network did not provide access to the Internet, or that Internet access was tightly controlled. Under these conditions the RSS might not be reachable, and therefore unusable. However, under these conditions the technician could install a RSA to achieve exactly the same services as a RSS. For installation of the RSA, the technician may: connect the RSA into the building network, such as through its Ethernet® port; and connect the RSA to a network segment, such as a DMZ (or other perimeter network, which is a physical or logical subnetwork that contains and exposes the building network to a larger untrusted network, such as the Internet), that is visible to all the fire alarm panels on the site (so that all of the fire alarm panels are able to communicate with the RSA over the network). After installation, the RSA may be used to communicate with the fire alarm control panels.

Figure 7:
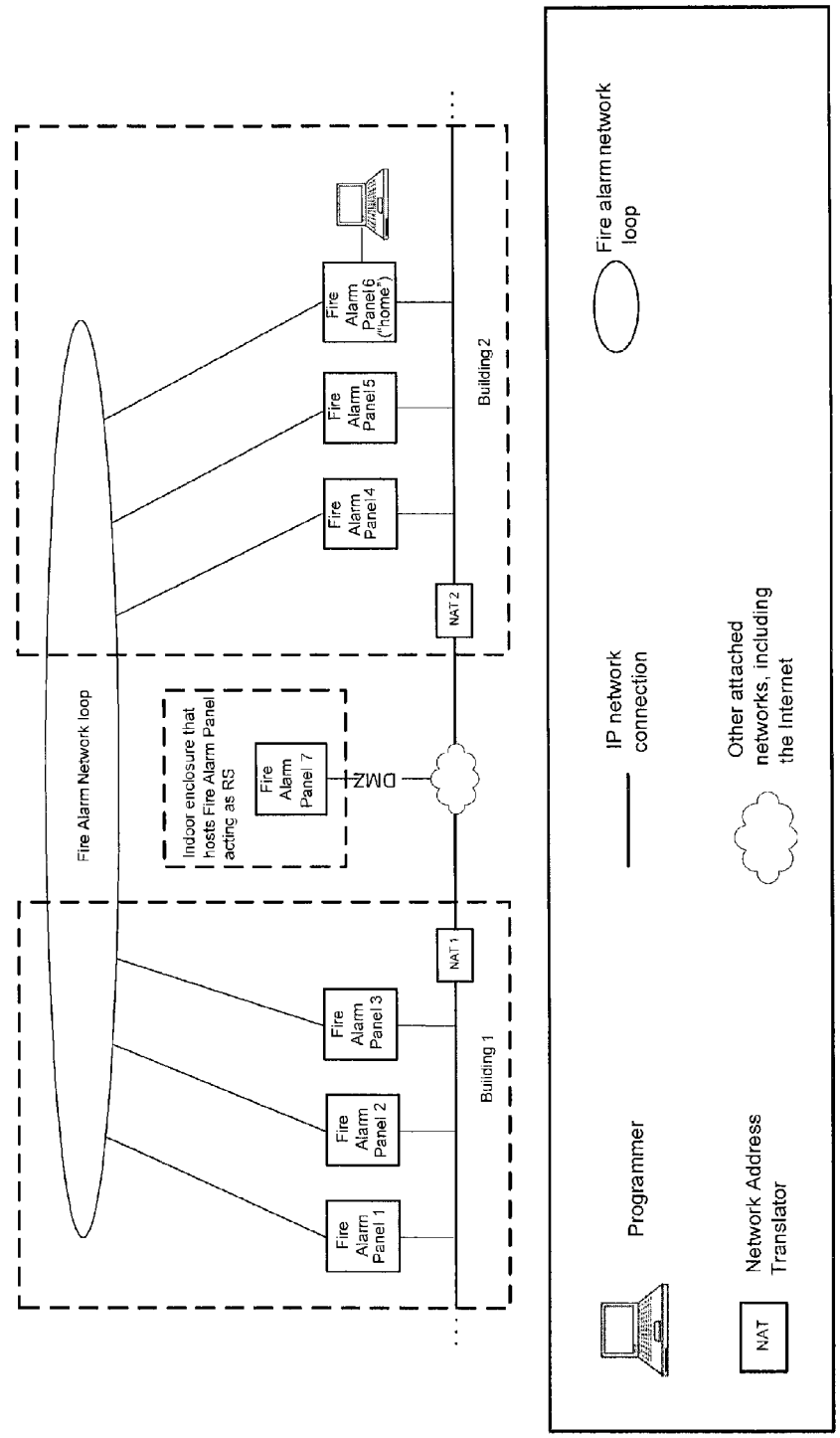
FIG. 7 is an example of a layout with the rendezvous server appliance integrated with a fire alarm panel and communicating with other fire alarm panels.

FIG. 7 illustrates a solution using Rendezvous Server functionality included in a fire alarm panel ("RS alarm panel"). In this way, the RS alarm panel is a fire alarm panel with the Rendezvous Server included therein. The RS alarm panel may be used in lieu of a RSA under certain circumstances. Configuring the RS alarm panel may include: the RS alarm panel acting as a RS is connected to a network segment, such as a DMZ, that is visible to all other fire alarm panels on the campus (all panels can communicate with the RS alarm panel; and the Rendezvous Server in the RS alarm panel uses the same network configuration as the building network interface card (BNIC) in that RS alarm panel).

The RS alarm panel may be used in place of a RSA if where the RSA was to be installed coincides with a location where a fire alarm panel is expected to be installed. In this case, the technician may simply install a fire alarm panel in that location and connects it to the DMZ of the IP network (just as if it were a RSA). No further configuration may be necessary.

As shown in FIG. 7 and similar to FIGS. 4-6, if the technician's laptop is attached to a fire alarm panel that is on both IP and fire alarm networks (a "home" panel), the technician can use the PSC software to discover and reach the fire alarm panels in both buildings despite the presence of NATs and a lack of Internet service. In this case, it is accomplished by placing a fire alarm panel in the DMZ which acts as a RS. No RSS or RSA is needed in this instance.

In order to ensure that a site's fire, building, or corporate networks are not compromised, both fire alarm panels and RS's may be able to restrict access to only those tools and users authorized to connect to them. Viewing the "cloud" in FIG. 2 being connected to a wider area network such as a campus subnet or the Internet may lead to unwanted access. In these cases, visibility and reachability could conceivably be extended to other sites across that network. This may represent a security risk that can be managed, since not every fire alarm panel that is potentially accessible over the network should, in fact, be reachable or even seen.

There are different ways to address the access control issue. One way to address the access control problem is to provide the tools and means to assign and manage access rights to users. In this solution, someone assigns and manages the users. Another way to address the access control problem is by having the Rendezvous Server kept secure through means that are tied directly to the physical (or virtual) presence of a technician and to local hardware. Namely, access to a RS is only allowed if the user is connected to a fire alarm panel on the customer's fire alarm network loop. Under these conditions, it is possible to access any fire alarm panel on the same fire alarm network loop as this "home" panel provided remote download is enabled on that fire alarm network loop, even if those panels would not normally be visible or accessible due to the presence of NATs or firewalls (see FIG. 8).

Figure 8:
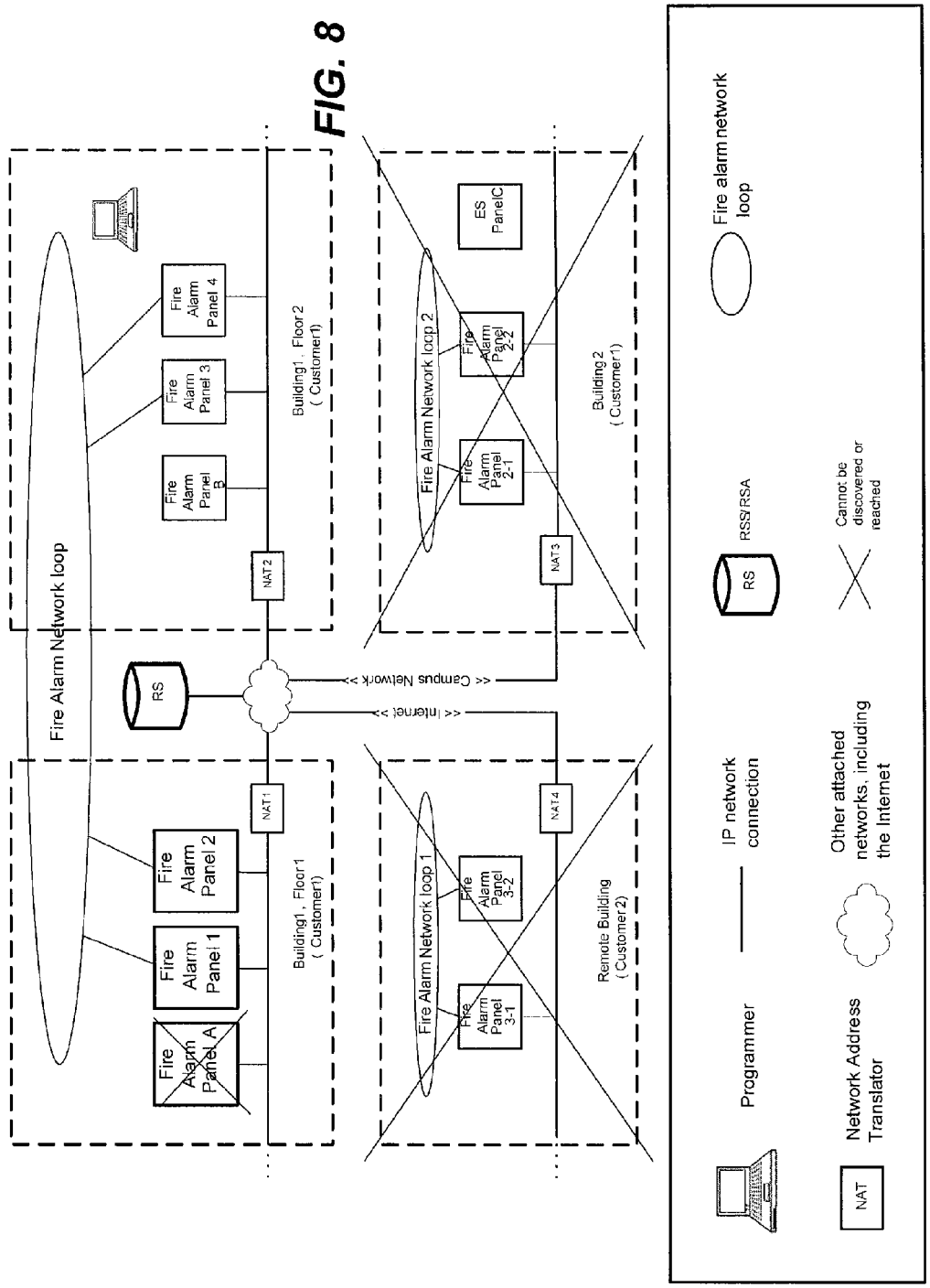
FIG. 8 is an example of a layout of a rendezvous server that communicates with some, but not all, of the fire alarm panels in different networks.

As shown in FIG. 8, a laptop, which includes the PSC software and is attached to a fire alarm panel, can discover and reach all fire alarm panels in building 1 of customer 1 because the fire alarm panels are on the same local subnet. However, outside of building 1, only fire alarm panels that are on the same fire alarm loop as the one that the "home" panel is connected to can be discovered and reached.

The laptop or other portable device may include software in order for the technician to communicate with panels in the fire alarm network loop. One example of the software is the Panel Selection Component (PSC) software, which is a software component that provides applications and their users with a standard means of discovering and selecting valid target fire alarm panels on an IP network (e.g., a "target" panel is a panel upon which some operation is to be performed). The PSC software is RS aware and is designed to automate the process of selecting panels whenever possible and to involve the technician in the selection process when it is absolutely necessary. The PSC software is also designed to ensure that the panels which are selected are validated as reachable.

Figure 9:
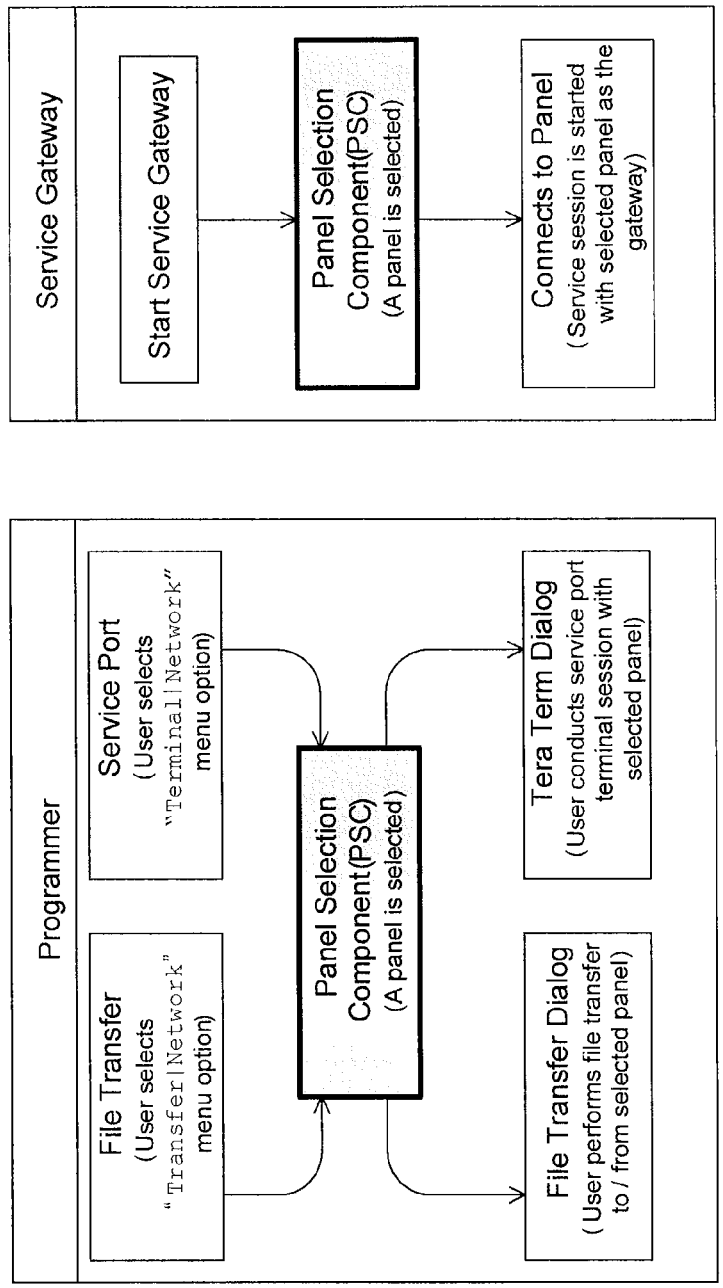
FIG. 9 is a block diagram of how the panel selection component (PSC) software is integrated into the user interface of the technician's Programmer's File Transfer and Service Port operations, and how the PSC software is integrated into the Service Gateway.

Other applications may work in conjunction with (or as a part of) the PSC software, such as a Programmer's File Transfer and Service Port (i.e. Terminal) operations, and the Service Gateway. FIG. 9 illustrates how the PSC software is integrated into the user interface of the Programmer's File Transfer and Service Port operations, and how it is integrated into the Service Gateway.

Selection of a panel may be done by a human (such as a technician). Alternatively, the PSC software itself can act as the "selector" if it has sufficient context to make the choice. For example, if the user's intended operation is a File Transfer of a specific job file, then the selected panel is the panel specified in that job. Alternatively, if the intended operation is a Service Port session, and the technician's computer is connected to a standalone panel, then the only panel that is selected is the standalone panel. In both of these cases, no user intervention is needed to make a panel selection since the context has determined what panel must be the selected one.

On the other hand, there are certain situations where a user's intervention may be required. For example, if the context is a Service Port session and the technician's computer is connected to a network of panels—all of which are valid candidates for selection—then it would be appropriate to have the user make a manual panel selection from a list of all the panels in that particular network.

So, the role of the PSC software is to contextually auto-select a "target" panel whenever it can, and to involve the user only when necessary. To exercise this role, the PSC software is provided with two pieces of information when it is called by the client application. These two pieces of information are the Session Type and the Panel Context. The Session Type is either "File Transfer" or "Service Port", and the Panel Context is a list of between zero and 99 panels. These two pieces of information provide the PSC with sufficient information about the context to determine its functional behavior.

Figure 10:
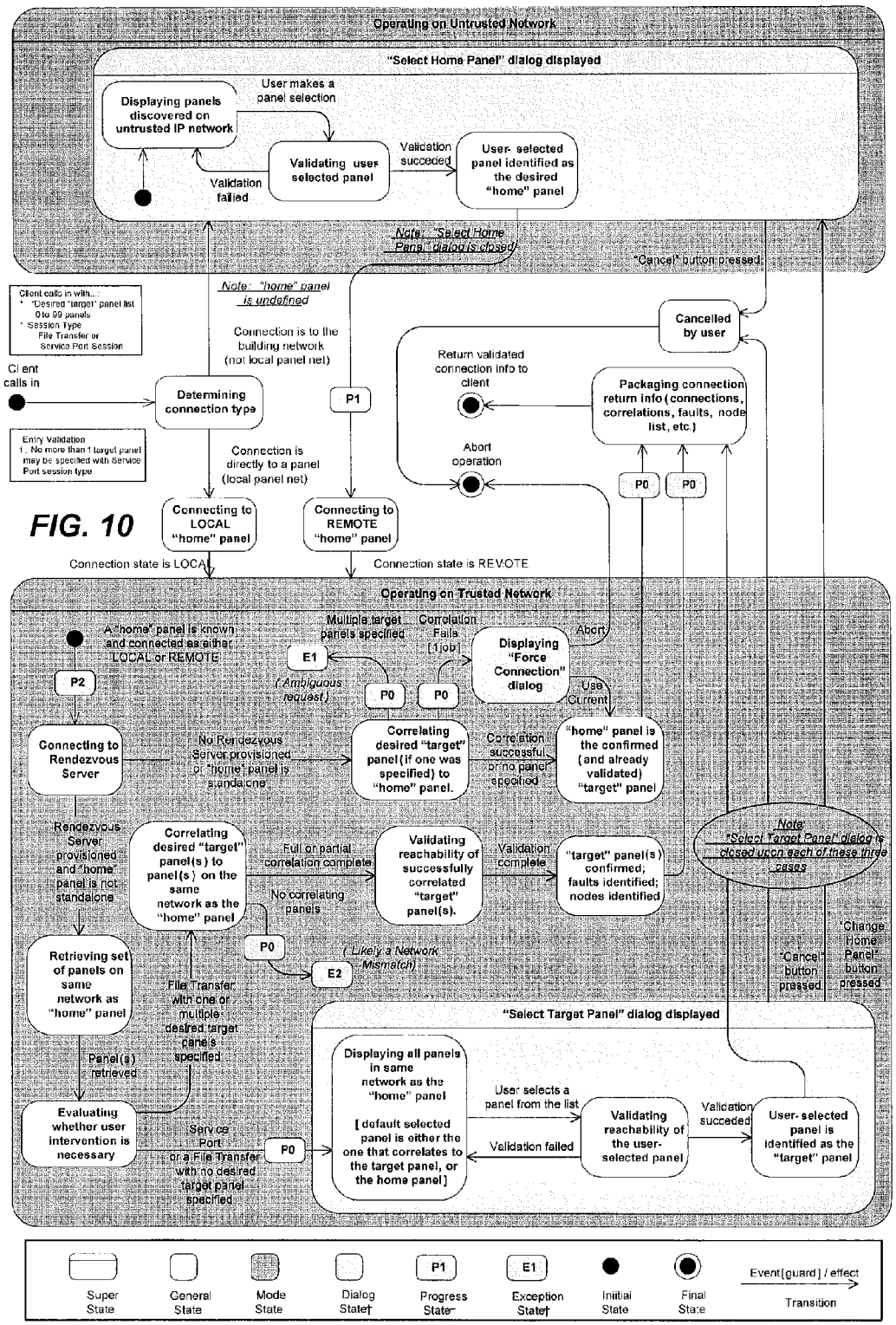
FIG. 10 is a state diagram of the PSC software.

FIG. 10 illustrates a state diagram for the PSC software. The "client" is the software program that uses the PSC. Clients may include the Programmer's File Transfer and Service Port functions, and the Service Gateway. It is also designed to support the Network Programmer. The "target" panel is the panel upon which the user wants to perform operations. For example, if one is performing a File Transfer, it is the panel to which (or from which) the File Transfer will be conducted. When the PSC software is called, the client may provide a desired "target" panel (or panels) that it is interested in operating on (i.e. a panel context).

Being in session with a "home" panel is a prerequisite for connecting to a "target" panel. It is through the "home" panel that access is gained to the trusted panel network (or secure overlay network, as discussed above). Typically, the "home" panel is simply the panel that the computer running the client is physically attached to; however, a physical connection is not necessarily required. By using the "Select Home Panel" dialog, the user may choose an alternate "home" panel over the IP network. Note that a "home" panel can also be the "target" panel.

Panel "correlation" is one of the duties performed by the PSC software, in which a desired panel (supplied when the PSC software is called) is correlated with a real panel discovered on the network. Typically, correlation is achieved by examining and matching panel properties such as serial number, name, node number, etc.

One or more dialogs may be displayed by the PSC software under conditions where user intervention is requested in order to choose a panel. "Select Home Panel" dialog permits a user to choose a "home" panel discovered on the untrusted IP network. "Select Target Panel" dialog permits a user to choose a panel from a filtered list of panels discovered on the trusted network. This filtered list displays all panels in the same fire alarm network loop as the currently selected "home" panel. "Force Connection" warning dialog is displayed in the situation where the panel associated with the currently loaded job does not correlate with the connected panel. In this instance, the user will be asked to confirm the connection.

The PSC software further includes one or more exception handling states, which represent exception conditions that use dialogs to notify the user, and provide the user with appropriate exception handling choices. The examples discussed herein are not an exhaustive list of all possible exceptions.

One exception state includes multiple target panels were specified, but only a single panel was discovered. If the home panel connection state is remote, an error dialog having two buttons, "Change Home Panel" and "Abort" may be presented to the user with the text, stating: "An operation intended for multiple target panels was requested, but only one panel was found. Would you like to select another home panel or abort the operation?" Clicking "Change Home Panel" will display the "Select Home Panel" dialog. Clicking "Abort" will abort the entire operation. If the home panel connection state is local, an error dialog having one button, "Abort", may be presented to the user with the text, stating: "An operation intended for multiple target panels was requested, but only one panel was found. Cannot continue." Clicking "Abort" will abort the entire operation.

Another exception state occurs when one or more target panels were specified, but no correlating panels were discovered on the network. If the home panel connection state is remote, an error dialog having three buttons, "Use Current", "Change Home Panel" and "Abort" may be presented to the user with the text, stating: "No matching panel could be found for the current job. Would you like to use the current home panel instead, change the home panel, or abort the operation?" Clicking on "Use Current" will make the current home panel the target panel. Clicking "Change Home Panel" will display the "Select Home Panel" dialog. Clicking "Abort" will abort the entire operation. If the home panel connection state is local, an error dialog having two buttons, "Use Current" and "Abort" may be presented to the user with the text, stating: "No matching panel could be found for the current job. Would you like to use the currently attached panel instead or abort the operation?" Clicking on "Use Current" will make the current home panel the target panel. Clicking "Abort" will abort the entire operation.

Further, the PSC software may include Progress Indicator States, which are states that describe how the PSC Progress Activity Indicator will be displayed (or not displayed) on screen.

Figure 11:
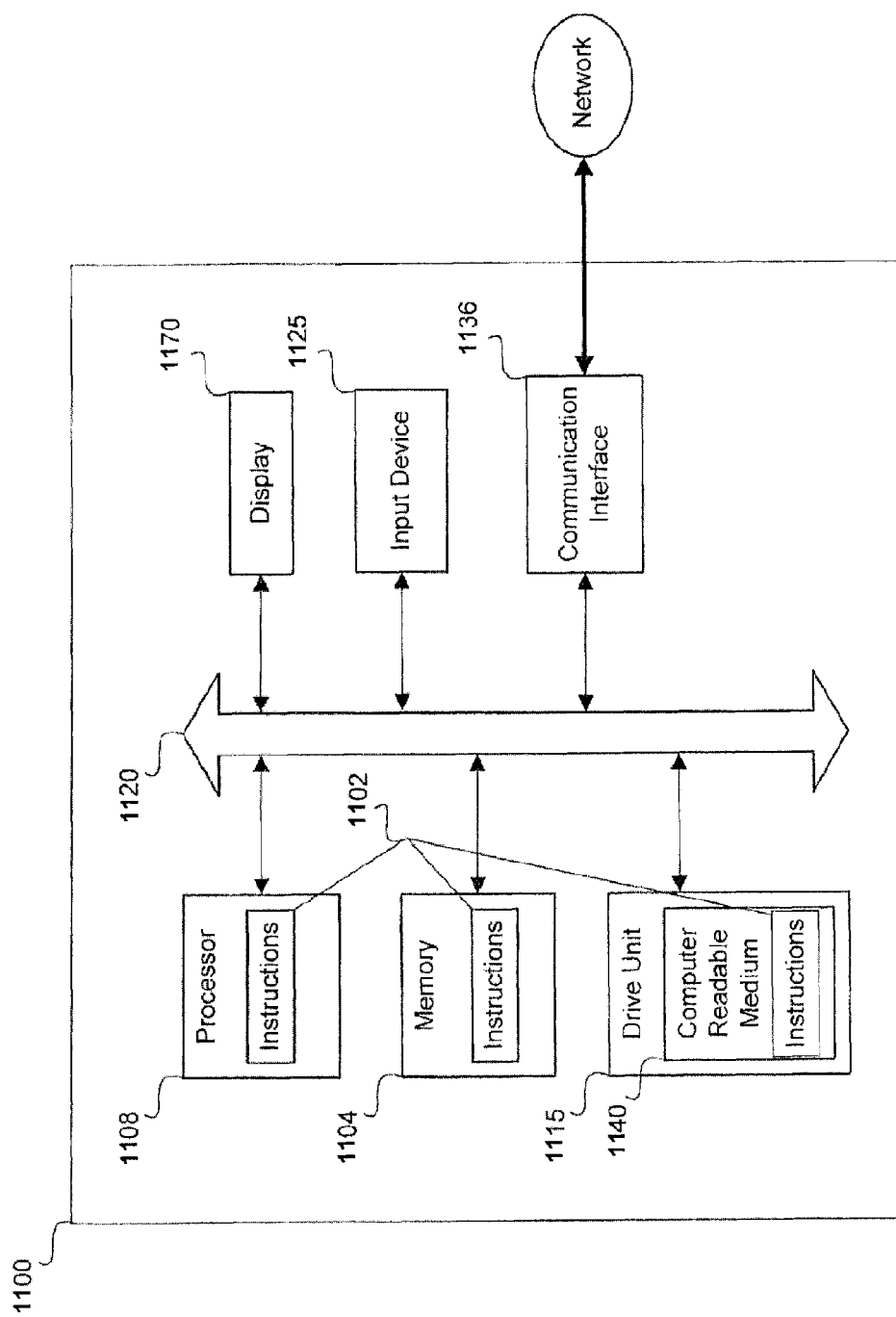
FIG. 11 is a block diagram of the programming device.

FIG. 11 illustrates a general computer system 1100, programmable to be a specific computer system 1100, which may represent any server (such as the rendezvous server), computer (such as the technician's computer including prog 114) or component (or group thereof) of the systems disclosed in FIGS. 1-2 and 4-9. The computer system 1100 may include an ordered listing of a set of instructions 1102 that may be executed to cause the computer system 1100 to perform any one or more of the methods or computer-based functions disclosed herein (such as, for example, disclosed in FIGS. 3A-B and 10). The computer system 1100 may operate as a stand-alone device or may be connected, e.g., using the network (such as the Internet or a fire alarm network), to other computer systems or peripheral devices.

In a networked deployment, the computer system 1100 may operate in the capacity of a server or as a client-user computer in a server-client user network environment, or as a peer computer system in a peer-to-peer (or distributed) network environment. The computer system 1100 may also be implemented as or incorporated into various devices, such as a personal computer or a mobile computing device capable of executing a set of instructions 1102 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 1100 may include a memory 1104 on a bus 1120 for communicating information. Code operable to cause the computer system to perform any of the acts or operations described herein may be stored in the memory 1104. For example, code may be used to perform the functionality described in the flow charts in FIGS. 3A-3B and 10 or the communications described with respect to FIGS. 1-2 and 4-9. The memory 1104 may be a random-access memory, read-only memory, programmable memory, hard disk drive or any other type of volatile or non-volatile memory or storage device.

The computer system 1100 may include a processor 1108, such as a central processing unit (CPU) and/or a graphics processing unit (GPU). The processor 1108 may include one or more general processors, digital signal processors, application specific integrated circuits, field programmable gate arrays, digital circuits, optical circuits, analog circuits, combinations thereof, or other now known or later-developed devices for analyzing and processing data. The processor 1108 may implement the set of instructions 1102 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1100 may also include a disk or optical drive unit 1115. The disk drive unit 1115 may include a computer-readable medium 1140 in which one or more sets of instructions 1102, e.g., software, can be embedded. Further, the instructions 1102 may perform one or more of the operations as described herein. The instructions 1102 may reside completely, or at least partially, within the memory 1104 and/or within the processor 1108 during execution by the computer system 1100. Accordingly, the databases, tables or the like resident at the rendezvous server may be stored in the memory 1104 and/or the disk unit 1115.

The memory 1104 and the processor 1108 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1100 may include an input device 1125, such as a keyboard or mouse, configured for a user to interact with any of the components of system 1100. It may further include a display 1170, such as a liquid crystal display (LCD), a cathode ray tube (CRT), or any other display suitable for conveying information. The display 1170 may act as an interface for the user to see the functioning of the processor 1108, or specifically as an interface with the software stored in the memory 1104 or the drive unit 1115.

The computer system 1100 may include a communication interface 1136 that enables communications via the communications network. The network may include wired networks, wireless networks, or combinations thereof. The communication interface 1136 network may enable communications via any number of communication standards, such as 802.11, 802.17, 802.20, WiMax, 802.15.4, cellular telephone standards, or other communication standards. Just because one of these standards is listed does not mean any one is preferred as any number of these standards may never actually be adopted in a commercial product.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method for an external computer to communicate with one or more target fire alarm panels, the one or more target fire alarm panels are configured to communicate in a fire alarm network and in a secure Internet Protocol (IP) overlay network, the fire alarm network being separate from the secure IP overlay network, the secure IP overlay network including one or more network address translation devices or firewalls, the one or more target fire alarm panels behind the one or more network address translation devices or firewalls in the secure IP overlay network and not being behind any network address translation devices in the fire alarm network, the method comprising:
  communicating, using the external computer and via a home alarm panel, with an authentication computer in the secure IP overlay network in order for the external computer to establish a secure connection with the secure IP overlay network and for the external computer to communicate using the secure IP overlay network, wherein the one or more target fire alarm panels in the secure IP overlay network comprises an undiscovered target fire alarm panel that is undiscovered to the external computer, wherein the home fire alarm panel is configured to communicate both via the fire alarm network and via the secure IP overlay network;
  sending, from the external computer and via the home fire alarm panel, a communication to a rendezvous server requesting communication limited to no more than devices in the secure IP overlay network; and
  in response to sending the communication, receiving a communication from the rendezvous server via the secure IP overlay network in order for the external computer to communicate, via the one or more network address translation devices or firewalls, with the undiscovered target fire alarm panel in the secure IP overlay network in order for the external computer to communicate, via the secure IP overlay network, with the undiscovered target fire alarm panel in the secure IP overlay network regarding operation of the undiscovered target fire alarm panel.

2. The method of claim 1, wherein sending the communication to the rendezvous server comprises sending a communication to the rendezvous server requesting information in order to communicate solely with devices associated with the secure IP overlay network;
  wherein receiving a communication from the rendezvous server comprises receiving the information, the information indicative of an address of the undiscovered target fire alarm panel; and
  further comprising using, by the external computer, the information to communicate with the one or more target fire alarm panels in the secure IP overlay network by using the address of the undiscovered target fire alarm panel.

3. The method of claim 2, wherein the information comprises a table of network addresses and port numbers for the devices on the secure IP overlay network.

4. The method of claim 3, wherein using the information to communicate with the one or more target fire alarm panels in the secure IP overlay network comprises:
  sending, via the secure IP overlay network, a polling communication to a network address translation device, the polling communication including at least one network address and at least one port for the undiscovered target fire alarm panel, the polling communication indicative to the network address translation device to forward at least a part of the polling communication to the undiscovered target fire alarm panel and indicative to the undiscovered target fire alarm panel to send information back to the external computer.

5. The method of claim 4, further comprising receiving a response from the undiscovered target fire alarm panel, wherein the response is indicative of a status of the undiscovered target fire alarm panel.

6. The method of claim 3, wherein using the information to communicate with the one or more target fire alarm panels in the secure IP overlay network comprises:
  sending a configuration communication to a network address translation device, the configuration communication including at least one network address and at least one port for the undiscovered target fire alarm panel, the configuration communication indicative to the network address translation device to forward at least a part of the configuration communication to the undiscovered target fire alarm panel and indicative to the undiscovered target fire alarm panel to configure.

7. The method of claim 1, wherein the rendezvous server is the authentication computer.

8. The method of claim 1, wherein communicating with the authentication computer in the secure IP overlay network comprises:
  sending, via the secure IP overlay network, a communication from the external computer to the authentication computer via a first fire alarm panel, the first fire alarm panel behind a first network address translation device from the perspective of the authentication computer.

9. The method of claim 1, wherein sending the communication to the rendezvous server comprises:
  sending a communication to the rendezvous server, the communication indicative of a request for the rendezvous server to forward to the undiscovered fire alarm panel, and
  wherein receiving the communication from the rendezvous server comprises receiving a response to the request.

10. The method of claim 1, wherein communicating with the undiscovered target fire alarm panel in the secure IP overlay network comprises communicating via a virtual private network.

11. A method for a rendezvous server to communicate with one or more target fire alarm panels and an electronic device in a secure Internet Protocol (IP) overlay network, the one or more target fire alarm panels being configured to communicate in a fire alarm network and in the secure IP overlay network, the fire alarm network being separate from the secure IP overlay network, the secure IP overlay network including one or more network address translation devices or firewalls, the one or more target fire alarm panels behind the one or more network address translation devices or firewalls in the secure IP overlay network and not being behind any network address translation devices in the fire alarm network, the electronic device for configuring or determining status of the one or more target fire alarm panels, the method comprising:

compiling address information for the one or more target fire alarm panels in a data construct indicative of target fire alarm panels limited to the secure IP overlay network;

receiving a communication from the electronic device, the electronic device communicating via a home alarm panel, the electronic device authenticated for communication in the secure IP overlay network, the communication indicative of the electronic device requesting communication limited to no more than devices in the secure IP overlay network in order for the electronic device to discover the one or more target fire alarm panels, wherein the home fire alarm panel is configured to communicate both via the fire alarm network and via the secure IP overlay network;

in response to the communication, accessing, by the rendezvous server, the address information to communicate with the one or more target fire alarm panels in the secure IP overlay network; and using the accessed address information in order for the electronic device to communicate, via the secure IP overlay network, with the one or more target fire alarm panels in the secure IP overlay network.

12. The method of claim 11, wherein using the accessed address information in order for the electronic device to communicate with the one or more target fire alarm panels comprises sending the address information to the electronic device in order for the electronic device to communicate with the one or more target fire alarm panels.

13. The method of claim 11, wherein using the accessed address information in order for the electronic device to communicate with the one or more target fire alarm panels comprises forwarding at least a part of the communication to the one or more target fire alarm panels using the accessed address information.

14. A computer configured to communicate with one or more target fire alarm panels, the one or more target fire alarm panels are configured to communicate in a fire alarm network and in a secure Internet Protocol (IP) overlay network, the fire alarm network being separate from the secure IP overlay network, the secure IP overlay network including one or more network address translation devices or firewalls, the one or more target fire alarm panels behind the one or more network address translation devices or firewalls in the secure IP overlay network and not being behind any network address translation devices in the fire alarm network, the computer comprising:

a communication interface; and a controller is communication with the communication interface, the controller configured to:

generate one or more authentication computer communications for sending to an authentication computer in the secure IP overlay network in order for the computer to establish a secure connection with the secure IP overlay network and for the computer to communicate using the secure IP overlay network, wherein the one or more target fire alarm panels in the secure IP overlay network comprises an undiscovered target fire alarm panel that is undiscovered to the computer;

send, via the communication interface and using a home alarm panel, the one or more authentication computer communications to the authentication computer, wherein the home fire alarm panel is configured to communicate both via the fire alarm network and via the secure IP overlay network;

generate one or more rendezvous server communications for sending to a rendezvous server via the secure IP overlay network in order for the computer to request communication, via the one or more network address translation devices or firewalls, limited to no more than devices in the secure IP overlay network;

send, via the communication interface, the one or more rendezvous server communications to the rendezvous server; and in response to sending the one or more rendezvous server communications, receive a communication from the rendezvous server in order for the computer to communicate, via the one or more network address translation devices or firewalls, with the undiscovered target fire alarm panel in the secure IP overlay network in order for the external computer to communicate, via the secure IP overlay network, with the undiscovered target fire alarm panel in the secure IP overlay network regarding operation of the undiscovered target fire alarm panel.

15. The computer of claim 14, wherein the controller is configured to receive the communication from the rendezvous server in order for the computer to communicate with the undiscovered target fire alarm panel by:

receiving the address information for the undiscovered target fire alarm panel; and using the address information to communicate with the undiscovered target fire alarm panel in the secure IP overlay network.

16. The computer of claim 15, wherein the address information comprises a table of network addresses and port numbers for the devices on the secure IP overlay network.

17. The computer of claim 16, wherein the controller is configured to use the address information to communicate with the undiscovered target fire alarm panel in the secure IP overlay network by:

sending, via the secure IP overlay network, a polling communication to a network address translation device, the polling communication including at least one network address and at least one port for the undiscovered target fire alarm panel, the polling communication indicative to the network address translation device to forward at least a part of the polling communication to the undiscovered target fire alarm panel and indicative to the undiscovered target fire alarm panel to send information back to the computer.

18. The computer of claim 17, wherein the controller is further configured to receive a response from the undiscovered target fire alarm panel, wherein the response is indicative of a status of the undiscovered target fire alarm panel.

19. The computer of claim 16, wherein the controller is configured to use the information to communicate with the undiscovered target fire alarm panel in the secure IP overlay network by:

sending a configuration communication to a network address translation device, the configuration communication including at least one network address and at least one port for the undiscovered target fire alarm panel, the configuration communication indicative to the network address translation device to forward at least a part of the configuration communication to the undiscovered target fire alarm panel and indicative to the undiscovered target fire alarm panel to configure.

20. The computer of claim 14, wherein the controller is configured to generate one or more authentication computer communications by:

generating a communication for sending to the authentication computer via a first fire alarm panel, the first fire alarm panel behind a first network address translation device from the perspective of the authentication computer.

21. The computer of claim 14, wherein the controller is configured to generate one or more rendezvous server communications by:

generating a communication for sending, via the secure IP overlay network, to the rendezvous server, the communication indicative of a request for the rendezvous server to forward to the undiscovered fire alarm panel in the secure IP overlay network.

22. The computer of claim 14, wherein the controller is configured to communicate with the undiscovered fire alarm panel in the secure IP overlay network by sending communications via a virtual private network.

23. A rendezvous server configured to communicate with one or more target fire alarm panels and an electronic device in a secure Internet Protocol (IP) overlay network, the one or more target fire alarm panels being configured to communicate in a fire alarm network and in the secure IP overlay network, the fire alarm network being separate from the secure IP overlay network, the secure IP overlay network including one or more network address translation devices or firewalls, the one or more target fire alarm panels behind the one or more network address translation devices or firewalls in the secure IP overlay network and not being behind any network address translation devices in the fire alarm network, the electronic device for configuring or determining status of the one or more target fire alarm, the rendezvous server comprising:

a communication interface configured to receive, via a home alarm panel, a communication from the electronic device, the electronic device authenticated for communication in the secure IP overlay network, the communication indicative of the electronic device requesting communication limited to no more than devices in the secure IP overlay network in order for the electronic device to discover at least one undiscovered target fire alarm panel, wherein the at least one undiscovered target fire alarm panel is undiscovered to the electronic device, the home fire alarm panel being configured to communicate both via the fire alarm network and via the secure IP overlay network;

a memory; and a controller in communication with the communication interface and the memory, the controller configured to:

compile address information for the one or more target fire alarm panels in a data construct indicative of target fire alarm panels limited to the secure IP overlay network;

in response to receiving the communication, access the address information in the memory to communicate with the at least one undiscovered target fire alarm panel in the secure IP overlay network; and use the accessed address information in order to send a communication, via the secure IP overlay network, the communication for the electronic device to communicate, via the one or more network address translation devices or firewalls, with the at least one undiscovered target fire alarm panel in the secure IP overlay network regarding operation of the least one undiscovered target fire alarm panel.

24. The rendezvous server of claim 23, wherein the controller is configured to use the accessed address information in order for the electronic device to communicate with the at least one undiscovered target alarm panel by sending the address information to the electronic device in order for the electronic device to communicate with the at least one undiscovered target alarm panel.

* * * * *